United States Patent [19]

Kataoka

[11] Patent Number: 5,379,123
[45] Date of Patent: Jan. 3, 1995

[54] FACSIMILE APPARATUS HAVING IMPROVED CODING FOR TRANSMISSION OF PLURAL IMAGES WITHOUT INTERRUPTION

[75] Inventor: Junnosuke Kataoka, Kawasaki, Japan

[73] Assignee: Canon Kabushiki Kaisha, Tokyo, Japan

[21] Appl. No.: 96,449

[22] Filed: Jul. 26, 1993

[30] Foreign Application Priority Data

Aug. 3, 1992 [JP] Japan .................. 4-206409

[51] Int. Cl.$^6$ ......................................... H04N 1/419
[52] U.S. Cl. .................. 358/427; 358/261.1
[58] Field of Search ............. 358/261.1, 261.2, 261.3, 358/426, 427, 431; 382/43, 56; H04N 1/419

[56] References Cited

U.S. PATENT DOCUMENTS 4,316,222  2/1982  Subramaniam .
5,067,023  11/1991  Kim .................. 358/261.1

FOREIGN PATENT DOCUMENTS 60-58775  4/1985  Japan .

*Primary Examiner*—Edward L. Coles, Sr.
*Assistant Examiner*—Kim Yen Vu
*Attorney, Agent, or Firm*—Fitzpatrick, Cella, Harper & Scinto

[57] ABSTRACT

A facsimile apparatus for high-speed transmission of a plurality of images. If the last one line of an image data to be transmitted first among the connected images is not an all-white line, an all-white line is added to the data and the image data is MMR-encoded. Further, zero to N-1 "1" bits (N : a system bus width) are added to the coded data so as to render the coded data a multiple of a predetermined data unit. The coded data is transferred to a modem for image transmission. Thereafter, a subsequent MMR-coded image data is transmitted. The apparatus can thus transmit byte-packed image data stored in a memory in advance for image transmission without decoding and encoding the image data or re-executing byte-packing.

26 Claims, 7 Drawing Sheets

FACSIMILE APPARATUS HAVING IMPROVED CODING FOR TRANSMISSION OF PLURAL IMAGES WITHOUT INTERRUPTION

BACKGROUND OF THE INVENTION

This invention relates to a facsimile apparatus and, more particularly, to a facsimile apparatus for a process of adding image data to another image data which has been encoded in accordance with the MMR (Modified Modified Read) scheme.

In a conventional facsimile apparatus having an image memory, when image data based on sender's time, date, telephone number, and other such information (hereinafter "transmission terminal identification" will be abbreviated as "TTI") is added to the head of image data (hereinafter, this type of data will be referred to as "additional image data") which has been MMR-coded from a transmission original and stored into the memory, the last main-scanning line is not always of all white (=blank) data pixels and the data amount is not always an exact multiple of a system bus width. For this reason, the conventional apparatus decodes the stored image data and adds the additional image data, further, it encodes the data again and transmits the coded data. Alternatively, the apparatus converts the data to which the additional data is added into a byte-pack (a status where image pixel data is used to fill in all the bits of a one byte data area) before it transmits the data.

In a case where additional image data is from an image original, similar procedures are required.

Thus, the above conventional apparatus must decode image data which has already been MMR-coded and stored in the image memory for adding additional image data and then encode the data again. In addition to such roundabout processings, the apparatus should re-execute byte-packing of image data which has already been byte-packed after MMR-coding and stored in the memory, in consideration of the data length of additional image data to be added to the head of the stored image data.

Such encoding of the MMR-coded-and-decoded data and re-execution of byte-packing requires quite a long period, which prevents high-speed transmission.

SUMMARY OF THE INVENTION

Accordingly, it is an object of the present invention to provide a facsimile apparatus which can transmit byte-packed image data stored in a memory subsequent to the transmission of TTI data, without decoding and encoding the image data and re-execution of byte-packing.

According to the present invention, the foregoing object is attained by providing a facsimile apparatus capable of transmitting image data, in which a second image is added after a first image, comprising: first addition means for adding white line data in which all pixels are white data after the last line of the first image; first coding means for encoding the first image to which the white line data has been added by the first addition means in accordance with the MMR coding scheme; second addition means for adding bits so as to render the coded data encoded by the first coding means to be a multiple of a predetermined data unit; and second coding means for encoding the second image in accordance with the MMR coding scheme.

In accordance with the present invention as described above, data for one line in which all the pixels are white data is added at the end of the last line of the first image, then the first image to which the white line data has been added is encoded in accordance with the MMR coding scheme, further, bits are added to the coded data so that the coded data will be a multiple of a predetermined data unit, and the second image is encoded in accordance with the MMR coding scheme.

It is another object of the present invention to provide a facsimile apparatus which can transmit byte-packed data based on an image original stored in a memory subsequent to the transmission of data based on an image original without decoding and encoding the stored data again and re-execution of byte-packing.

According to the present invention, the foregoing object is attained by providing a facsimile apparatus capable of connecting a plurality of images and continuously transmitting the image data, comprising: first coding means for encoding the plurality of images respectively in accordance with MMR coding scheme; first addition means for adding a white line data in which all pixels are white data so as to render all pixels of the last line of the plurality of images except an image to be transmitted last, white data; and second addition means for adding a bit to the plurality of images except the image to be transmitted last so as to render data amount of the images except the image to be transmitted last a multiple in a predetermined data unit.

In accordance with the present invention as described above, a plurality of images are respectively encoded in accordance with the MMR coding scheme. Then, white data for one line is added to all the images but the last image of sequential transmission so that the all the pixels in the last line of each image except the last image will be white data, and bits are added to the coded data for all the images except the last image so that the coded data will become a multiple in a predetermined data unit.

The invention is particularly advantageous since transmission of byte-packed data stored in a memory after image data based on TTI or image data based on an image original is possible without decoding and encoding the stored image data and re-execution of byte-packing. This enables high-performance facsimile transmission.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

The embodiments of a facsimile apparatus having an eight-bit width system bus will be described below.

FIRST EMBODIMENT

Figure 1:
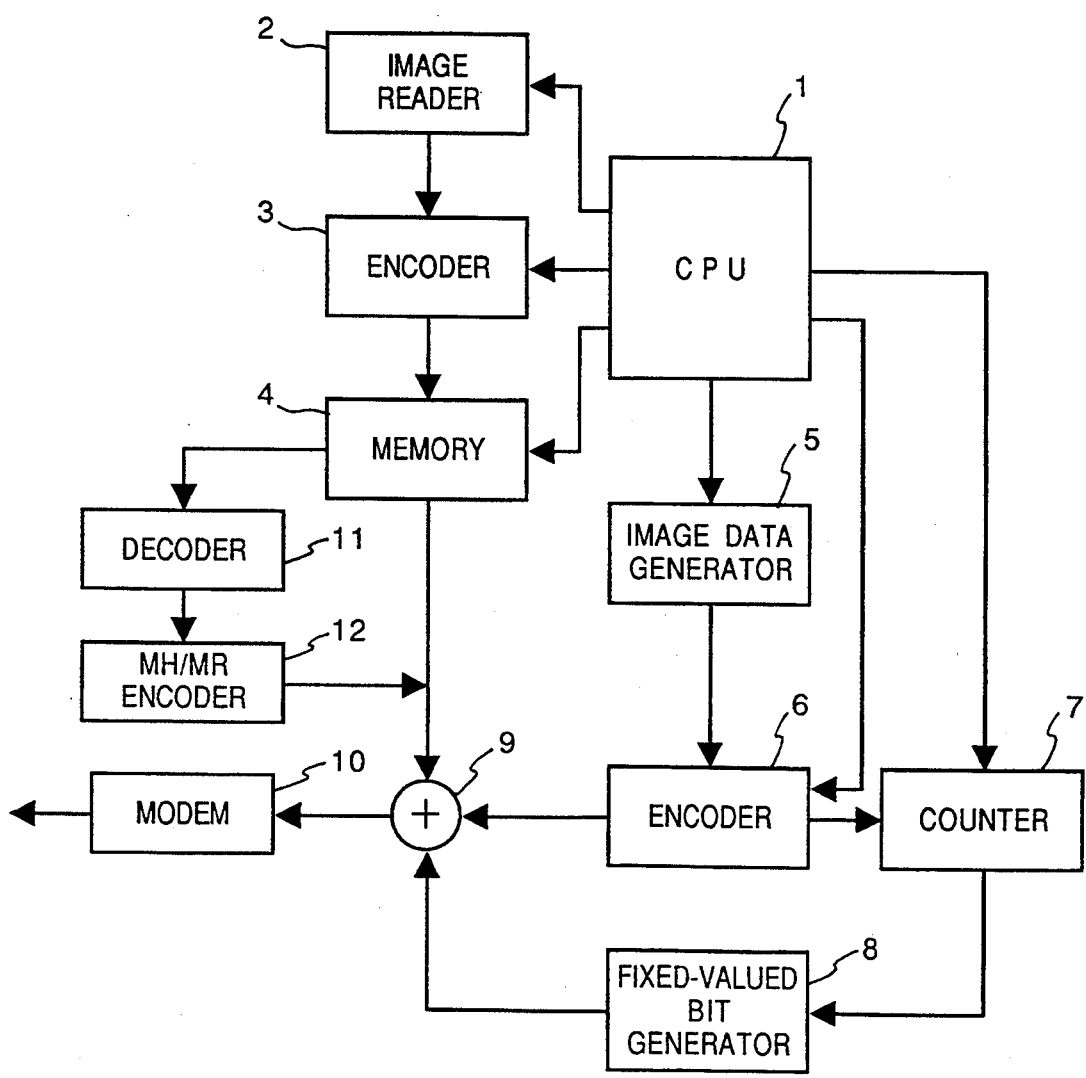
FIG. 1 is a block diagram showing the configuration of a facsimile apparatus according to a first embodiment of the present invention.

FIG. 1 is a block diagram showing the configuration of the facsimile apparatus according to the first embodiment of the present invention. In FIG. 1, reference numeral 1 denotes a CPU for controlling the respective circuits; and 2, an image reader for sequentially reading an image signal for one line in a main-scanning direction from a transmission original and generating a signal array representing a black-and-white binary value. The image reader 2 comprises an image sensing device such as a CCD and an optical system. Numeral 3 denotes an encoder, and 4, a memory. The black-and-white data binary signal array is MMR-coded by the encoder 3, then sequentially byte-packed as eight-bit byte data from the head of the data, and stored into the memory 4. Numeral 5 denotes an image data generator for generating an image to be added to a transmission image. For example, the image data generator 5 generates transmission terminal identification (TTI) at the head of a transmission image. Numeral 6 denotes an encoder, 7, a counter; 8, a fixed-valued bit generator; 9, an adder, 10, a modem; 11, a decoder for decoding coded data stored in the memory 4, and 12, a MH/MR encoder for encoding data decoded by the decoder 11 in accordance with an MH or MR coding scheme.

The encoder 6 which performs MH/MR/MMR coding encodes the TTI using the same coding scheme as that used for the transmission image (note that encoders 6 and 3 do not have to be separately provided; they can be replaced with one common encoder). If the MMR coding scheme is selected at this time, all the pixels of the last one line in the main-scanning direction of the additional image are made white data. This "all-white data line" is made by forcibly replacing all the pixels of the last line of the TTI image with white data pixels; alternatively, one line in which all pixels are white data is added to the TTI image subsequent to the last line.

The counter 7 counts up the MMR-coded data which is stored in the memory 4 in eight-bit byte-packed status to represent the transmission image, and the encoder 6 transfers the data in eight-bit (one byte) units to the modem 10. In a case where the last byte-packed data of the MMR-coded TTI additional image is insufficient in quantity as eight-bit (one byte) packed-byte, according to the conventional method, the boundary of the byte-pack is changed in order to transfer other MMR-coded image data to the modem 10 subsequent to the current data transfer.

In such case, in the present embodiment, the fixed-valued bit generator 8 generates zero to seven bits having a value "1" so as to form eight bits, and then, the adder 9 adds the "1" bits so that the last byte can become a bite-pack and transfers the byte pack to the modem 10. Thereafter, the MMR-coded image data stored in the memory 4 is transferred to the modem 10.

In the MMR-coding, the value "1" of a bit following an all-white data pixel line means that the next line is also an all-white data pixel line. Thus, inserting zero to seven "1" bits means adding zero to seven all-white data pixel lines to the image.

Figure 2:
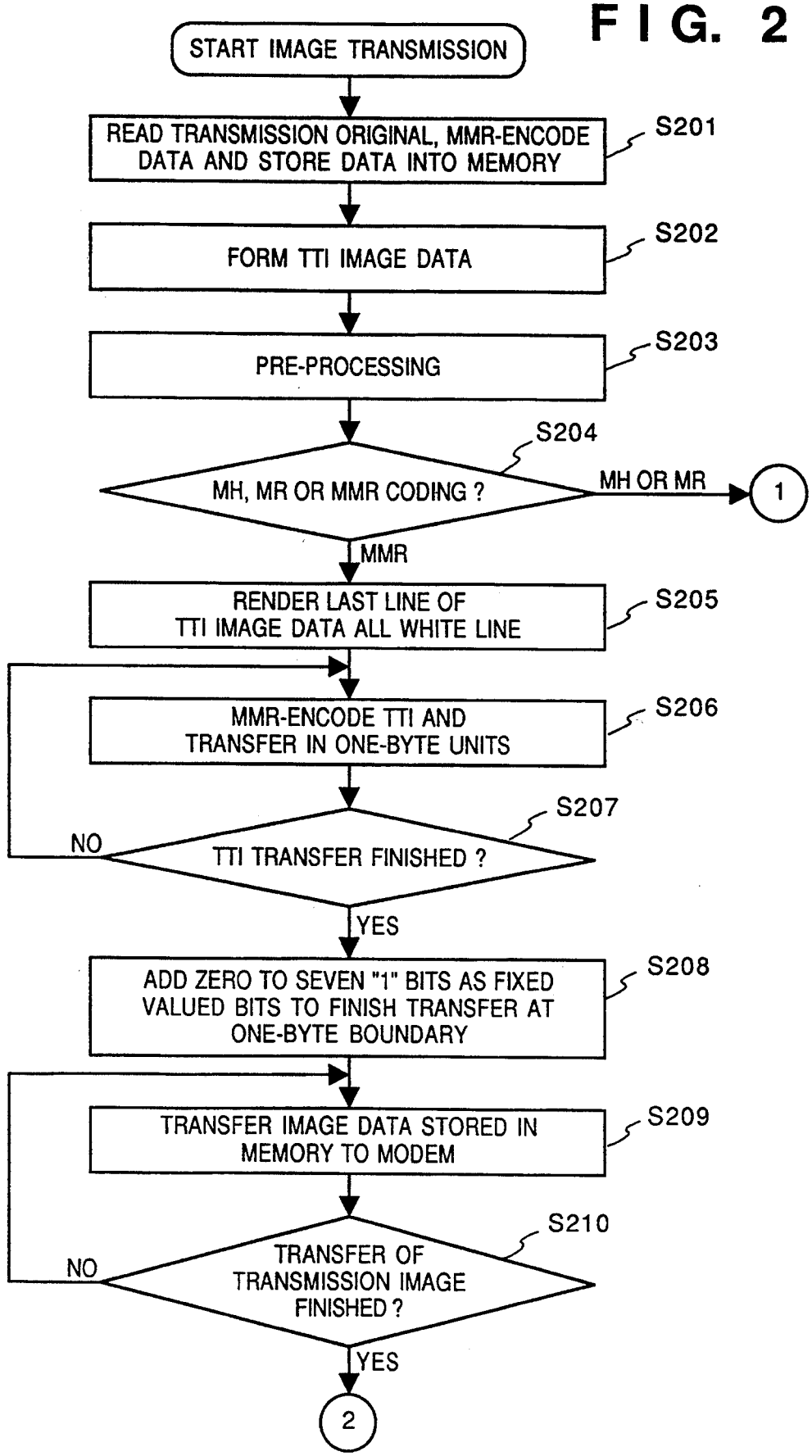
FIG. 2 is a flowchart showing image transmission operation in the first embodiment of the present invention.
Figure 3:
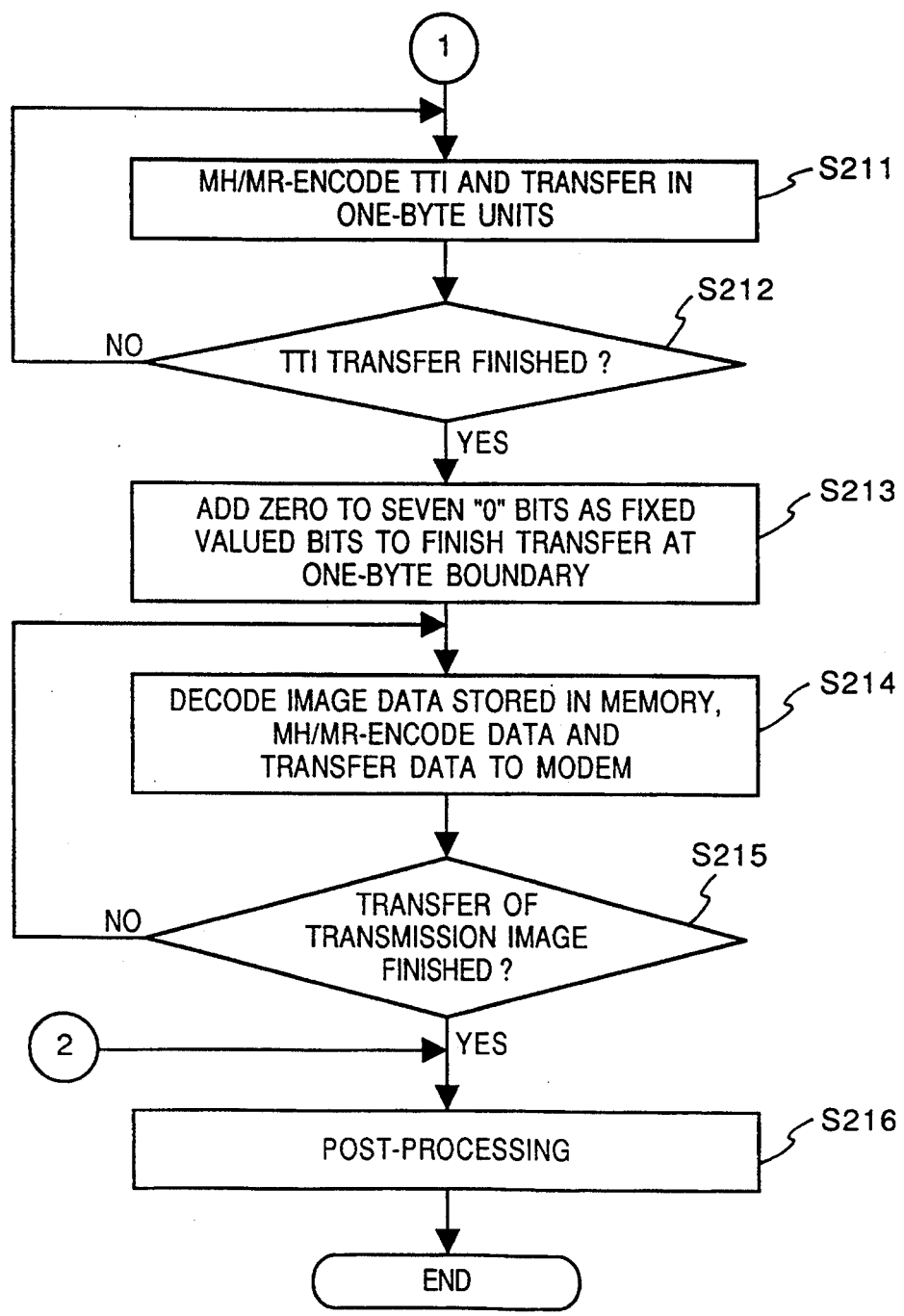
FIG. 3 is a flowchart showing the image transmission operation in the first embodiment of the present invention.

FIGS. 2 and 3 are flowcharts showing an image transmission operation in accordance with the first embodiment.

Upon image transmission, first, the image reader 2 reads a transmission original in step S201, and the encoder 3 performs MMR-coding on the read data and stores the MMR-coded data into the memory 4. Next, additional image data based on TTI (hereinafter referred to as "TTI image data") is generated in step S202, and the modem 10 performs communication protocol processings (generally referred to as "pre-processing") such as session establishment between the transmitting and the receiving apparatuses and negotiation.

In step S204, a coding scheme acceptable for the receiving apparatus is examined. If the coding scheme is the MMR coding scheme, processing proceeds to step S205, in which all the pixels of the last one line in the main-scanning direction are set to white data. More specifically, all the pixels of the last line of the TTI image data outputted from the image data generator 5 are forcibly replaced with white data pixels; alternatively, the image data generator 5 outputs a line in which all the pixels are white data subsequent to the last line of the TTI image. The encoder 6 MMR-encodes the TTI image with the all-white pixel line. In steps S206 and S207, the encoder 6 transfers the MMR-coded TTI image data to the modem 10 in byte units until no data remains.

In step S208, the fixed-valued bit generator 8 adds zero to seven "1" bits in accordance with the number of empty bits left in the last byte of the TTI image data to fill the empty bits so that the TTI image data ends at a byte boundary. In the MMR-coding, if the value "1" of a bit which follows an all-white line appears, it means that the next line is also an all-white line. Thus, inserting zero to seven "1" bit data means adding zero to seven all-white lines to the image. In step S209, the image data stored in the memory 4 is transferred to the modem 10 without changing the byte-pack boundary. In step S210, whether or not the image data transfer is finished is determined. If the transfer is not finished, it is continued; otherwise, the processing proceeds to step S216 to perform communication protocol processings (post-processing) such as session termination and line disconnection, and the memory transmission ends.

If coding schemes other than the MMR coding are used (e.g., MH coding or MR coding) in step S204, the processing proceeds to step S211, in which the encoder 6 MH-encodes or MR-encodes the TTI image data from the image data generator 5 and transfers the coded data to the modem 10 in byte units. In step S212, if it is determined that the transmission is finished, the processing proceeds to step S213, in which the fixed-valued bit generator 8 generates zero to seven "0" bits and adds them to the coded data so that the last bit of the EOL code indicative of the boundary of line in the MH/MR coding corresponds to the byte boundary position. Thus, the transmission is terminated at the byte boundary.

In step S214, the decoder 11 decodes the MMR-coded image data stored in the memory 4, and the MH/MR encoder 12 MH/MR encodes the data and transfers the coded data to the modem 10 in byte units. If it is determined that the image data transfer is finished in step S215, the processing proceeds to step S216 to perform the post-processing and terminate the image transmission.

As described above, according to the present embodiment, in a case where an additional TTI image is added at the head of image data which has been MMR-coded from a transmission original and stored in the memory, the last main-scanning line of the additional image is made an all-white line. In addition, zero to seven "1" bits are added to the last byte of the additional image so as to render the amount of coded data a multiple of eight bits (system bus width). The additional image and the image based on the transmission original are clearly distinguished, and the data is punctuated at the byte-boundary. This enables transmission of byte-backed data stored in the memory subsequent to the TTI additional image without decoding and encoding of the stored data or re-execution of byte-packing.

SECOND EMBODIMENT

In the first embodiment, the image data generator 5 generates an additional image based on a TTI, and the additional data is transmitted before transmission of image data read from a transmission original. In this embodiment, additional data to be transmitted before the transmission of image data is also read from an image original, and this additional data and the transmission image data read from the transmission original are sequentially transmitted.

Figure 4:
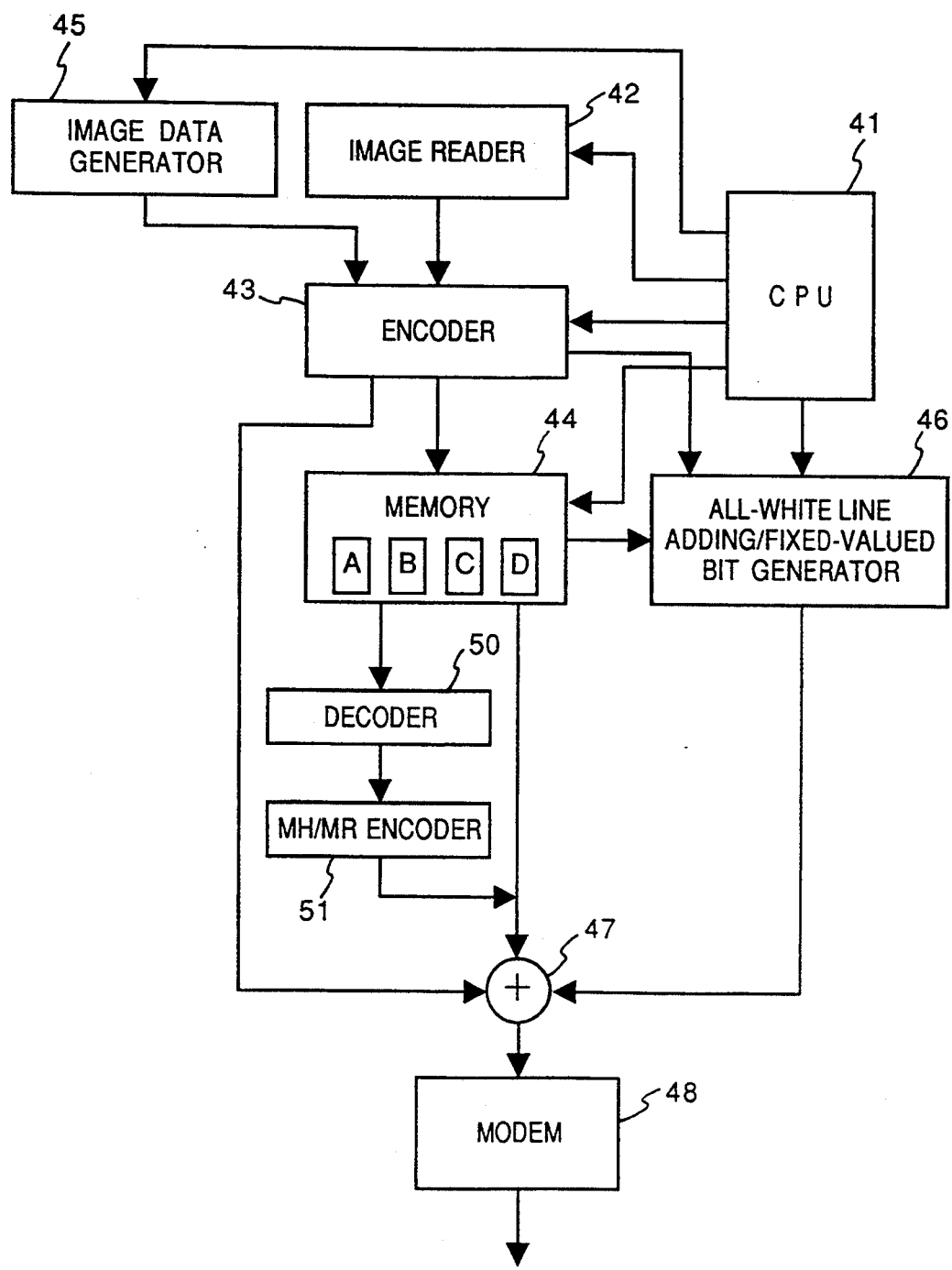
FIG. 4 is a block diagram showing the configuration of a facsimile apparatus according to a second embodiment of the present invention.

FIG. 4 is a block diagram showing the configuration of a facsimile apparatus according to the second embodiment of the present invention. In FIG. 4, reference numeral 41 denotes a CPU for controlling the respective circuits, and 42, an image reader for sequentially reading an image signal for one line in a main-scanning direction from a transmission original, and generating a signal array indicative of a black-and-white binary value. The image reader 42 comprises an image sensing device such as a CCD and an optical system. Numeral 43 denotes an encoder for MMR-coding of the black-and-white binary signal array, then byte-packing the array, and storing the coded data into memory 44. The memory 44 is where a plurality of images A to D are stored. In the memory 44, an area for storing the image A is memory A, for the image B, memory B, for the image C, memory C; and the image D, memory D.

Numeral 45 denotes an image data generator for generating, e.g., image data based on TTI. Data generated by the image data generator 45 is MH/MR/MMR-encoded by the encoder 43 and stored into the memory 44 or directly transferred to modem 48. Numeral 46 denotes an all-white line adding/fixed-valued bit generator for adding an all-white line to the last line of the image data transferred from the encoder 43 or the memory 44 or adding zero to seven "1" bits to the data so that the image data ends at a byte boundary, and transferring the data to the modem 48. Numeral 47 denotes an adder.

The modem 48 demodulates the received image data and performs image transmission. Numeral 50 denotes a decoder for decoding the coded data stored in the memory 44, and 51, a MH/MR encoder for encoding the data decoded by the decoder 50 in accordance with the MH or MR coding scheme.

Figure 5:
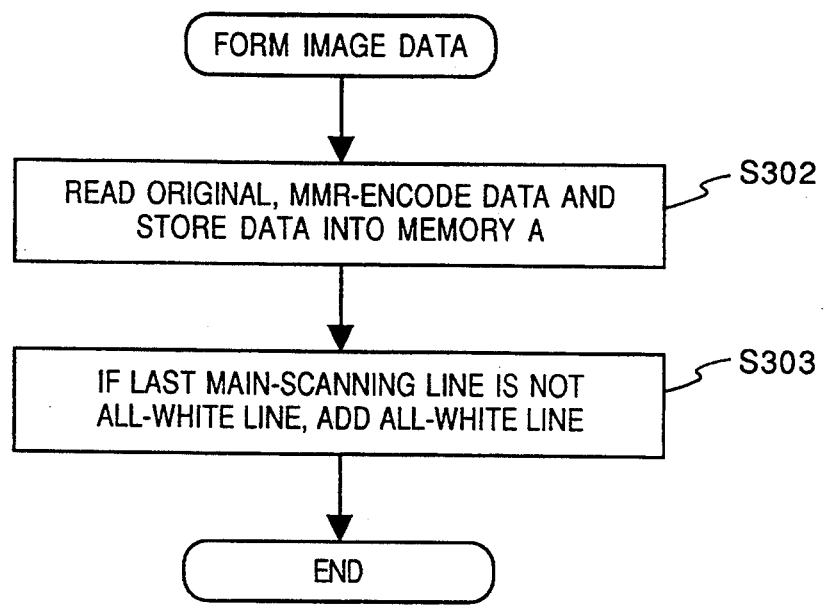
FIG. 5 is a flowchart showing image transmission operation in the second embodiment of the present invention.
Figure 6:
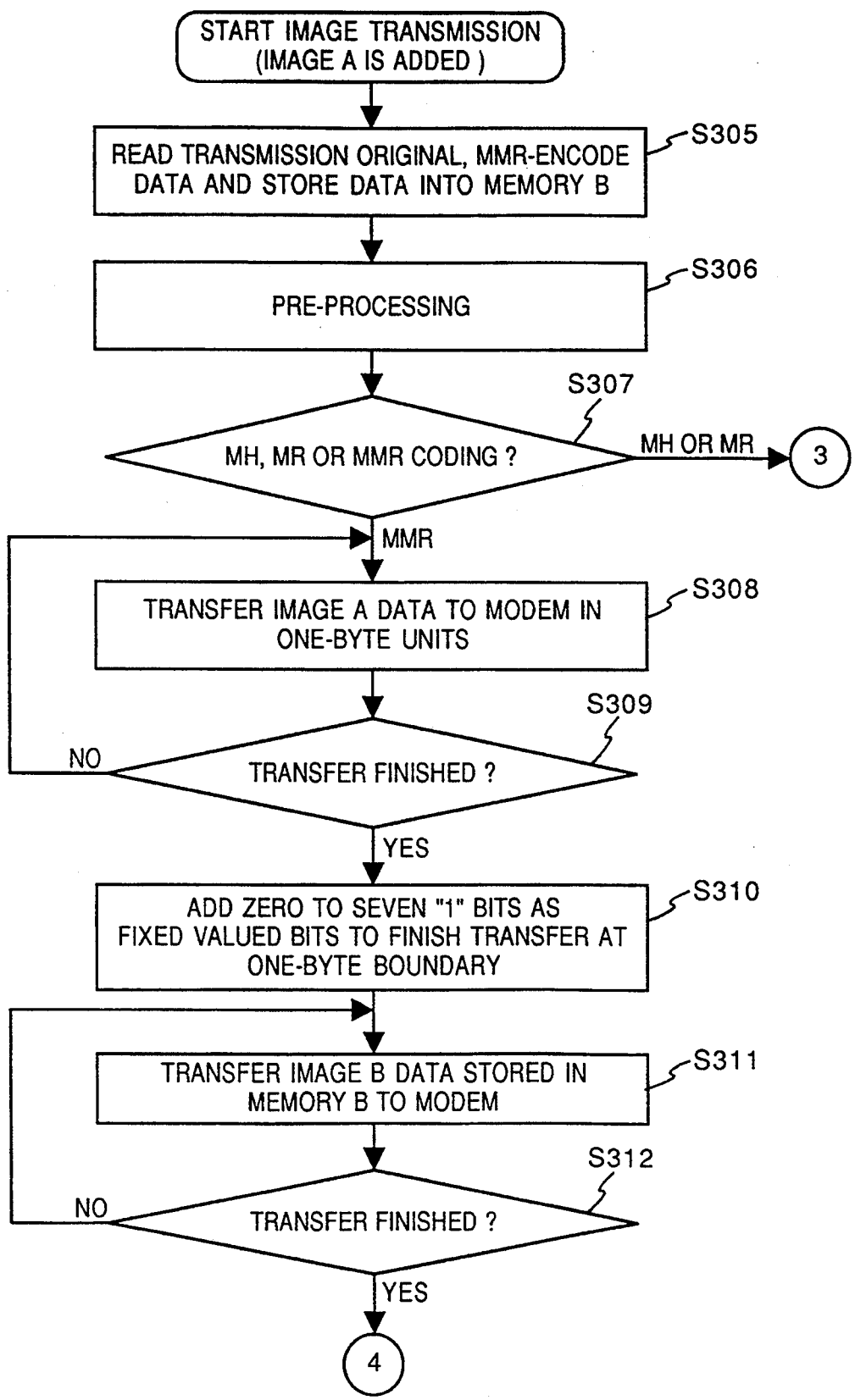
FIG. 6 is a flowchart showing the image transmission in the second embodiment of the present invention.
Figure 7:
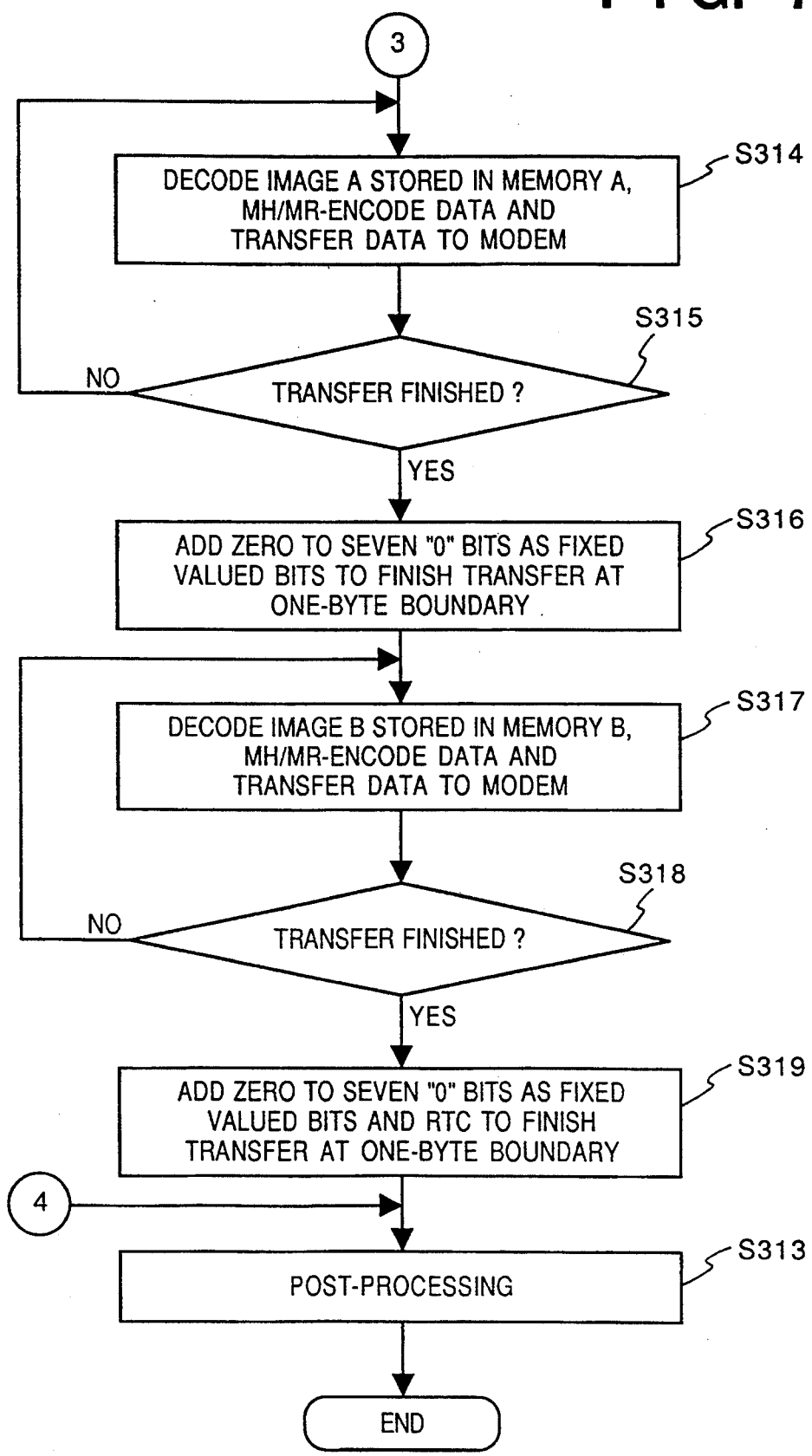
FIG. 7 is a flowchart showing the image transmission in the second embodiment of the present invention.

FIGS. 5 to 7 are flowcharts showing the image transmission operation performed by the facsimile apparatus having the above construction. In the example to be described below, an image original, as an additional image, has been read in advance and the read data has been stored in the memory 44 as image A, and upon image transmission, another image original (image B) is read and transmitted together with the image A.

First, the generation of the image A will be described with reference to the flowchart of FIG. 5.

in step S302, the image reader reads an image original as an additional image, and the encoder 43 performs MMR-coding and byte-packing on the read data and stores the coded data into the memory 44. In step S303, whether or not the last main-scanning line of the data is an all-white line is examined. If not, the all-white line adding/fixed-valued bit generator 46 adds an all-white line to the data, encodes the white line data and stores it into the memory 44.

Next, reading of the image B and the image transmission of the images A and B will be described with reference to the flowcharts of FIGS. 6 and 7.

In step S305, the image reader reads the transmission image (image B), and the encoder 43 performs MMR-coding then byte-packing on the read data and stores the coded data into the memory 44. In step S306, the modem 48 performs pre-processing, which corresponds to the processing in step S203 of the first embodiment. In step S307, a coding scheme usable for transmission to the receiving apparatus is examined. If it is the MMR coding scheme, the processing proceeds to step S308.

In step S308, the image A stored in the memory 44 is transferred to the modem 48 in byte units. Conventionally, if the image A data does not end at a byte boundary, the boundary of the byte-packed image B should be changed in order to transmit the image B subsequent to the image A. In this embodiment, if it is determined that the image A transfer is finished in step S309, the processing proceeds to step S310 in which the fixed-valued bit generator 46 adds zero to seven "1" bits to the data so that the image A ends at a byte boundary.

In the MMR coding, a "1" bit following an all-white line means that the next line is also an all-white line. Thus, inserting zero to seven "1" bits means adding zero to seven all-white lines to the image A.

In step S311, the image B data stored in the memory 44 is transferred to the modem 48 without changing the byte-pack boundary. If it is determined that the image B transfer is finished in step S312, the processing proceeds to step S313 in which post-processing that corresponds to the processing in step S216 of the first embodiment is performed and the image transmission ends.

If it is judged that a coding scheme other than the MMR coding (MH coding or MR coding) is usable for the image transmission in step S307, the processing proceeds to step S314, in which the decoder 50 decodes the MMR-coded image A data stored in the memory 44, then the MH/MR encoder 51 encodes the decoded data in accordance with MH/MR coding scheme and transfers the coded data to the modem 48 in byte units.

In step S315, if it is determined that the coded data transfer is finished, the processing proceeds to step S316, in which the all-white line adding/fixed-valued bit generator 46 adds zero to seven "0" bits to the coded data depending upon the number of empty bits (bits not filled with data) in the last data byte so that the data transfer ends at a byte boundary.

Next, the decoder 50 decodes the image B data stored in the memory 44, then the MH/MR encoder 51 MH/MR encodes the decoded data and transfers the coded data to the modem 48 in byte units in step S317. In step S318, if it is determined that the image B transfer is finished, the processing proceeds to step S319, in which the all-white line adding/fixed-valued bit generator 46 adds zero to seven "0" bits and RTC to the last data byte depending on the number of empty bits so that the data transfer ends at a byte boundary, similar to step S316. Thereafter, post-processing is performed in step S313 and the image transmission ends.

As described above, according to the second embodiment, upon transmission of image data which has been MMR-coded and stored in the memory 44 together with another image data as additional data which has been MMR-coded and stored prior to the transmission image data, the last one main-scanning line of the additional data is made an all-white line, and zero to seven "1" bits are added to the additional data so that the data ends at a byte boundary. This arrangement enables transmitting of the byte-packed data in the memory without decoding and encoding or re-execution of byte-packing, subsequent to the transmission of the additional data.

The present invention can be applied to a system constituted by a plurality of devices, or to an apparatus comprising a single device. Furthermore, that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus for transmitting image data, in which a second image is added to follow a first image, comprising:
   means for providing a first image composed of a plurality of lines of pixels of image data and including a last line;
   first data appending means for appending a line of data in which all pixels are white data after the last line of the first image to form a supplemented image;
   first coding means for encoding the supplemented image in accordance with an MMR coding scheme to provide first coded data;
   second data appending means for appending bits to the first coded data to form supplemented coded data having a total number of bits equal to an integral multiple of a predetermined number of bits defining a predetermined data unit for transmission preparation; and
   second coding means for encoding a second image in accordance with the MMR coding scheme to provide second coded data, whereby said apparatus can transmit the supplemented coded data in said predetermined data units followed without interruption by the second coded data.

2. The facsimile apparatus according to claim 1, further comprising memory means for storing the second coded data encoded by said second coding means.

3. The facsimile apparatus according to claim 1, wherein
   if a number of bits of the first coded data encoded by said first coding means is not an integral multiple of the predetermined data unit, said second data appending means appends a number of bits having a value "1" to an end of the first coded data so that the total number of bits of of the first coded data will become an integral multiple of the predetermined data unit.

4. The facsimile apparatus according to claim 1, further comprising first transmission means for transmitting the supplemented coded data and subsequently transmitting the second coded data encoded by said second encoding means.

5. The facsimile apparatus according to claim 1, wherein said providing means comprises image generation means for generating the first image.

6. The facsimile apparatus according to claim 5, wherein
   said image generation means generates the first image based on information concerning a facsimile transmission originator.

7. The facsimile apparatus according to claim 1, further comprising:
   communication means for communicating with a communication destination apparatus;
   third coding means for encoding the first image in accordance with an MH/MR coding scheme to provide third coded data based on a result of communication with the communication destination apparatus by said communication means;
   third data appending means for appending bits to the third coded data to form second supplemented coded data having a total number of bits equal to an integral multiple of the predetermined data unit;
   decoding/encoding means for decoding the second coded data encoded by said second coding means to provide decoded data based on the result of communication with the communication destination apparatus by said communication means, and encoding the decoded data in accordance with the MH/MR coding scheme to provide fourth coded data; and
   second transmission means for transmitting the second supplemented coded data and subsequently transmitting the fourth coded data encoded by said decoding/encoding means.

8. The facsimile apparatus according to claim 1, further comprising reading means for reading an original to provide the second image.

9. A facsimile apparatus for connecting a plurality of images and continuously transmitting resultant image data, comprising:
   means for providing a plurality of images, each image being composed of a plurality of lines of pixel data and each including a last line;
   first data appending means for appending a line of data in which all pixels are white data after the last line of each of the plurality of images to form respective supplemented images, except for a one of the images to be transmitted last;
   coding means for encoding the supplemented images in accordance with an MMR coding scheme to provide respective first coded data, said coding means also encoding the image to be transmitted last in accordance with the MMR coding scheme to provide second coded data; and second data appending means for appending a number of bits to each of the first coded data to form respective supplemented coded data each having a respective total number of bits equal to an integral multiple of a predetermined number of bits defining a predetermined data unit for transmission preparation, whereby said apparatus can transmit each of said supplemented coded data followed by said second coded data without interruption.

10. The facsimile apparatus according to claim 9, further comprising:
reading means for reading the plurality of images respectively; and
memory means for storing the first and second coded data encoded by said coding means in accordance with the respective images.

11. The facsimile apparatus according to claim 9, further comprising first transmission means for continuously transmitting each of the supplemented coded data and subsequently transmitting the second coded data.

12. The facsimile apparatus according to claim 9, wherein, if a number of bits of any of the first coded data encoded by said coding means is not an integral multiple of the predetermined data unit, said second data appending means appends a number of bits having a value "1" to an end of the respective first coded data so that the total number of bits of the respective first coded data is an integral multiple of the predetermined data unit.

13. The facsimile apparatus according to claim 9, further comprising:
communication means for communicating with a communication destination apparatus;
first decoding/encoding means for decoding each of the first coded data to provide first decoded data based on a result of communication with the transmission destination apparatus by said communication means, and encoding the first decoded data again in accordance with an MH/MR coding scheme to provide respective third coded data;
third data appending means for appending bits to each of the third coded data to form respective second supplemented coded data having a respective total number of bits equal to an integral multiple of the predetermined data unit;
second decoding/encoding means for decoding the second coded data to provide second decoded data based on the result of communication with the transmission destination apparatus by said communication means, and encoding the second decoded data again in accordance with the MH/MR coding scheme to provide fourth coded data; and
second transmission means for continuously transmitting each of the second supplemented coded data and subsequently transmitting the fourth coded data.

14. A facsimile apparatus for transmitting image data, in which a second image is added to follow a first image, comprising:
means for providing a first image composed of a plurality of lines of pixels of image data and including a last line;
data amending means for making the last line of the first image into a line of data in which all pixels are white data to form an amended image;
first coding means for encoding the amended image in accordance with an MMR coding scheme to provide first coded data;
data appending means for appending bits to the first coded data to form supplemented coded data having a total number of bits equal to an integral multiple of a predetermined number of bits defining a predetermined data unit for transmission preparation; and
second coding means for encoding a second image in accordance with the MMR coding scheme to provide second coded data, whereby said apparatus can transmit the supplemented coded data in said predetermined data units followed without interruption by the second coded data.

15. The facsimile apparatus according to claim 14, further comprising memory means for storing the second coded data encoded by said second coding means.

16. The facsimile apparatus according to claim 14, wherein
if a number of bits of the first coded data encoded by said first coding means is not an integral multiple of the predetermined data unit, said data appending means appends a number of bits having a value "1" to an end of the first coded data so that the total number of bits of the first coded data will become an integral multiple of the predetermined data unit.

17. The facsimile apparatus according to claim 14, further comprising first transmission means for transmitting the supplemented coded data and subsequently transmitting the second coded data encoded by said second encoding means.

18. The facsimile apparatus according to claim 14, wherein said providing means comprises image generation means for generating the first image.

19. The facsimile apparatus according to claim 14, wherein
said image generation means generates the first image based on information concerning a facsimile transmission originator.

20. The facsimile apparatus according to claim 14, further comprising:
communication means for communicating with a communication destination apparatus;
third coding means for encoding the first image in accordance with an MH/MR coding scheme to provide third coded data based on a result of communication with the communication destination apparatus by said communication means;
second data appending means for appending bits to the third coded data to form second supplemented coded data having a total number of bits equal to an integral multiple of the predetermined data unit;
decoding/encoding means for decoding the second coded data encoded by said second coding means to provide decoded data based on the result of communication with the communication destination apparatus by said communication means, and encoding the decoded data in accordance with the MH/MR coding scheme to provide fourth coded data; and
second transmission means for transmitting the second supplemented coded data and subsequently transmitting the fourth coded data encoded by said decoding/encoding means.

21. The facsimile apparatus according to claim 14, further comprising reading means for reading an original to provide the second image.

22. A facsimile apparatus for connecting a plurality of images and continuously transmitting resultant image data, comprising:

means for providing a plurality of images, each image being composed of a plurality of lines of pixel data and each including a last line;

data amending means for making the last line of each of the plurality of images into a line of data in which all pixels are white data to form respective amended images, except for a one of the images to be transmitted last;

coding means for encoding the supplemented images in accordance with an MMR coding scheme to provide respective first coded data, said coding means also encoding the image to be transmitted last in accordance with the MMR coding scheme to provide second coded data; and data appending means for appending a number of bits to each of the first coded data to form respective supplemented coded data each having a respective total number of bits equal to an integral multiple of a predetermined number of bits defining a predetermined data unit for transmission preparation, whereby said apparatus can transmit each of said supplemented coded data followed by said second coded data without interruption.

23. The facsimile apparatus according to claim 22, further comprising:

reading means for reading the plurality of images respectively; and memory means for storing the first and second coded data encoded by said coding means in accordance with the respective images.

24. The facsimile apparatus according to claim 23, further comprising first transmission means for continuously transmitting each of the supplemented coded data and subsequently transmitting the second coded data.

25. The facsimile apparatus according to claim 23, wherein, if a number of bits of any of the first coded data encoded by said coding means is not an integral multiple of the predetermined data unit, said data appending means appends a number of bits having a value "1" to an end of the respective first coded data so that the total number of bits of the respective first coded data is an integral multiple the predetermined data unit.

26. The facsimile apparatus according to claim 23, further comprising:

communication means for communicating with a communication destination apparatus;

first decoding/encoding means for decoding each of the first coded data to provide first decoded data based on result of communication with the transmission destination apparatus by said communication means, and encoding the first decoded data again in accordance with an MH/MR coding scheme to provide respective third coded data;

second data appending means for appending bits to each of the third coded data to form respective second supplemented coded data having a respective total number of bits equal to an integral multiple of the predetermined data unit;

second decoding/encoding means for decoding the second coded data to provide second decoded data based on the result of communication with the transmission destination apparatus by said communication means, and encoding the second decoded data again in accordance with the MH/MR coding scheme to provide fourth coded data; and second transmission means for continuously transmitting each of the second supplemented coded data and subsequently transmitting the fourth coded data.

* * * * *

UNITED STATES PATENT AND TRADEMARK OFFICE
CERTIFICATE OF CORRECTION

PATENT NO. : 5,379,123
DATED : January 3, 1995
INVENTOR(S) : JUNNOSUKE KATAOKA

It is certified that error appears in the above-identified patent and that said Letters Patent is hereby corrected as shown below:

COLUMN 3

Line 25, "circuits;" should read --circuits,--.
    Line 40, "counter;" should read --counter,-- and "generator;" should read --generator,--.
    Line 41, "modem;" should read --modem,--.

COLUMN 4

Line 5, "bite-pack" should read --byte-pack--.

COLUMN 5

Line 54, "memory C;" should read --memory C,--.

COLUMN 6

Line 15, "in" should read --In--.

UNITED STATES PATENT AND TRADEMARK OFFICE
CERTIFICATE OF CORRECTION

PATENT NO. : 5,379,123
DATED : January 3, 1995
INVENTOR(S) : JUNNOSUKE KATAOKA

It is certified that error appears in the above-identified patent and that said Letters Patent is hereby corrected as shown below:

<u>COLUMN 7</u>

Line 31, "that" should be deleted.

Signed and Sealed this

Twentieth Day of June, 1995

Attest:

BRUCE LEHMAN

Attesting Officer     Commissioner of Patents and Trademarks